United States Patent
Hsiao et al.

(10) Patent No.: US 10,339,635 B2
(45) Date of Patent: Jul. 2, 2019

(54) IMAGE PROCESSING METHOD AND IMAGE PROCESSING APPARATUS

(71) Applicant: Realtek Semiconductor Corp., HsinChu (TW)

(72) Inventors: Ching-Ju Hsiao, Tainan (TW); Kai Liu, Taipei (TW); Wen-Tsung Huang, Chiayi (TW)

(73) Assignee: Realtek Semiconductor Corp., HsinChu (TW)

( * ) Notice: Subject to any disclaimer, the term of this patent is extended or adjusted under 35 U.S.C. 154(b) by 48 days.

(21) Appl. No.: 15/725,291

(22) Filed: Oct. 5, 2017

(65) Prior Publication Data

US 2018/0322615 A1 Nov. 8, 2018

(30) Foreign Application Priority Data

May 8, 2017 (TW) .............................. 106115081 A

(51) Int. Cl.
*G06T 5/00* (2006.01)
*G06T 7/13* (2017.01)
*G06T 5/20* (2006.01)

(52) U.S. Cl.
CPC .............. *G06T 5/002* (2013.01); *G06T 5/003* (2013.01); *G06T 5/20* (2013.01); *G06T 7/13* (2017.01); *G06T 2207/10024* (2013.01); *G06T 2207/20192* (2013.01)

(58) Field of Classification Search
USPC ........ 382/181, 199, 254, 266, 275, 162, 167
See application file for complete search history.

(56) References Cited

U.S. PATENT DOCUMENTS

| | | | | |
|---|---|---|---|---|
| 6,731,821 | B1* | 5/2004 | Maurer | G06K 9/40 382/263 |
| 2001/0007478 | A1* | 7/2001 | Kim | H04N 5/208 348/606 |
| 2004/0028271 | A1* | 2/2004 | Pollard | H04N 1/58 382/162 |
| 2004/0135798 | A1* | 7/2004 | Someya | G06T 5/20 345/690 |
| 2004/0190023 | A1* | 9/2004 | Aoyama | G06T 5/004 358/1.9 |
| 2004/0263495 | A1* | 12/2004 | Sugino | G09G 3/3611 345/204 |

(Continued)

FOREIGN PATENT DOCUMENTS

TW 200813890 3/2008
TW 201001335 1/2010

*Primary Examiner* — Fayyaz Alam
(74) *Attorney, Agent, or Firm* — Winston Hsu

(57) ABSTRACT

An image processing method for processing an input image is provided. The image processing method includes the following steps: selecting a pixel of the input image; determining if the pixel is a first image edge according to at least one first calibrated pixel and at least one second pixel in the input image, in which the first calibrated pixel corresponds to at least one first pixel in the input image; and replacing a high frequency component of at least one channel of the pixel with a first calibrating high frequency component to generate a calibrated pixel if the pixel is not the first image edge, and maintaining the pixel as the calibrated pixel if the pixel is the first image edge.

18 Claims, 9 Drawing Sheets

| R(i-1, j-2) | R(i-1, j-1) | R(i-1, j) | R(i-1, j+1) | R(i-1, j+2) |
|---|---|---|---|---|
| R(i, j-2) | R(i, j-1) | R(i, j) | R(i, j+1) | R(i, j+2) |

(56) References Cited

U.S. PATENT DOCUMENTS

| | | | |
|---|---|---|---|
| 2005/0249430 A1* | 11/2005 | Lim | H04N 1/4092 382/266 |
| 2008/0122953 A1* | 5/2008 | Wakahara | G06T 5/10 348/241 |
| 2010/0098348 A1* | 4/2010 | Zhang | H04N 5/21 382/262 |
| 2010/0302413 A1* | 12/2010 | Kawashima | G06T 5/004 348/241 |
| 2011/0170010 A1* | 7/2011 | Chiu | G06T 5/50 348/625 |
| 2014/0313350 A1* | 10/2014 | Keelan | H04N 9/045 348/188 |
| 2015/0010250 A1* | 1/2015 | Omi | G06T 5/10 382/275 |
| 2015/0271459 A1* | 9/2015 | Chuang | G06K 9/03 348/242 |
| 2016/0086309 A1* | 3/2016 | Hsu | G06T 3/4015 382/162 |
| 2018/0322616 A1* | 11/2018 | Guigues | G06T 5/002 |

* cited by examiner

FIG. 1

| R(i-1, j-2) | R(i-1, j-1) | R(i-1, j) | R(i-1, j+1) | R(i-1, j+2) |
| R(i, j-2) | R(i, j-1) | R(i, j) | R(i, j+1) | R(i, j+2) |

| Rp(i-1, j-2) | Rp(i-1, j-1) | Rp(i-1, j) | Rp(i-1, j+1) | Rp(i-1, j+2) |
|---|---|---|---|---|
| R(i, j-2) | R(i, j-1) | R(i, j) | R(i, j+1) | R(i, j+2) |

FIG. 5

IMAGE PROCESSING METHOD AND IMAGE PROCESSING APPARATUS

BACKGROUND OF THE INVENTION

1. Field of the Invention

The present disclosure relates to an image processing method and an image processing apparatus, and particularly relates to an image processing method and an image processing apparatus which can suppress noise.

2. Description of the Prior Art

In order to enhance the reality of image color, the ISP (image processor) always provides a color calibrating apparatus to transform the original signals received by the ISP to signals matching visions of human eyes. The color calibrating apparatus performs linear transforming via multiplying image pixel information with a coefficient matrix, to generate output for a digital image. Such coefficient matrix can be called a color correction matrix (CCM).

In a low light environment, the ISP always provides gain processing to the original signal, to maintain image brightness. However, the noise is also amplified while performing the gain processing. In addition, since human eyes are sensitive to color noise, the eyes feel image quality deterioration for an image processed by the gain processing easily. Accordingly, image distortion always happens during color restoration.

In order to suppress the color noise in the image, an infinite impulse response (IIR) low pass filtering is performed via performing a low pass filtering to a target pixel and a previous pixel of the target pixel. However, an image dragging issue may happen if the IIR low pass filtering is performed to a region having significant image color variation.

SUMMARY OF THE INVENTION

Therefore, one objective of the present application is to provide an image processing method and an image suppressing apparatus that can reduce the image dragging issue.

One embodiment of the present disclosure provides an image processing method for processing an input image. The image processing method includes the following steps: selecting a pixel of the input image; determining if the pixel is a first image edge according to at least one first calibrated pixel and at least one second pixel in the input image, in which the first calibrated pixel corresponds to at least one first pixel in the input image; and replacing a high frequency component in at least one channel of the pixel with a first calibrating high frequency component to generate a calibrated pixel if the pixel is not the first image edge, and maintaining the pixel as the calibrated pixel if the pixel is the first image edge.

Another embodiment of the present disclosure provides an image processing apparatus. The image processing apparatus includes an image edge detection module and a calibration module. The image edge detecting module determines if a pixel of the input image is a first image edge according to at least one first calibrated pixel and at least one second pixel of the input image, in which the at least one first calibrated pixel corresponds to at least one first pixel of the input image. The calibrating module replaces a high frequency component in at least one channel of the pixel with a first calibrating high frequency component if the pixel is not the first image edge, to generate a calibrated pixel, and configured to maintain the pixel as the calibrated pixel if the pixel is the first image edge.

In view of the above-mentioned embodiments, the conventional dragging issue can be avoided since the noise suppressing is not performed on image edges. In addition, the image can have expected color and a better image quality through the processing of the above-mentioned color calibrating matrix.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a schematic diagram illustrating image pixels according to one embodiment of the present disclosure.

FIG. 5 is a schematic diagram illustrating image pixels according to another embodiment of the present disclosure.

DETAILED DESCRIPTION

Different embodiments are provided in following description to explain concept of the present disclosure. The apparatuses, systems, or modules mentioned in following embodiments can be implemented with hardware, e.g., circuit, or hardware with software (e.g., executing programs by a processor).

Figure 2:
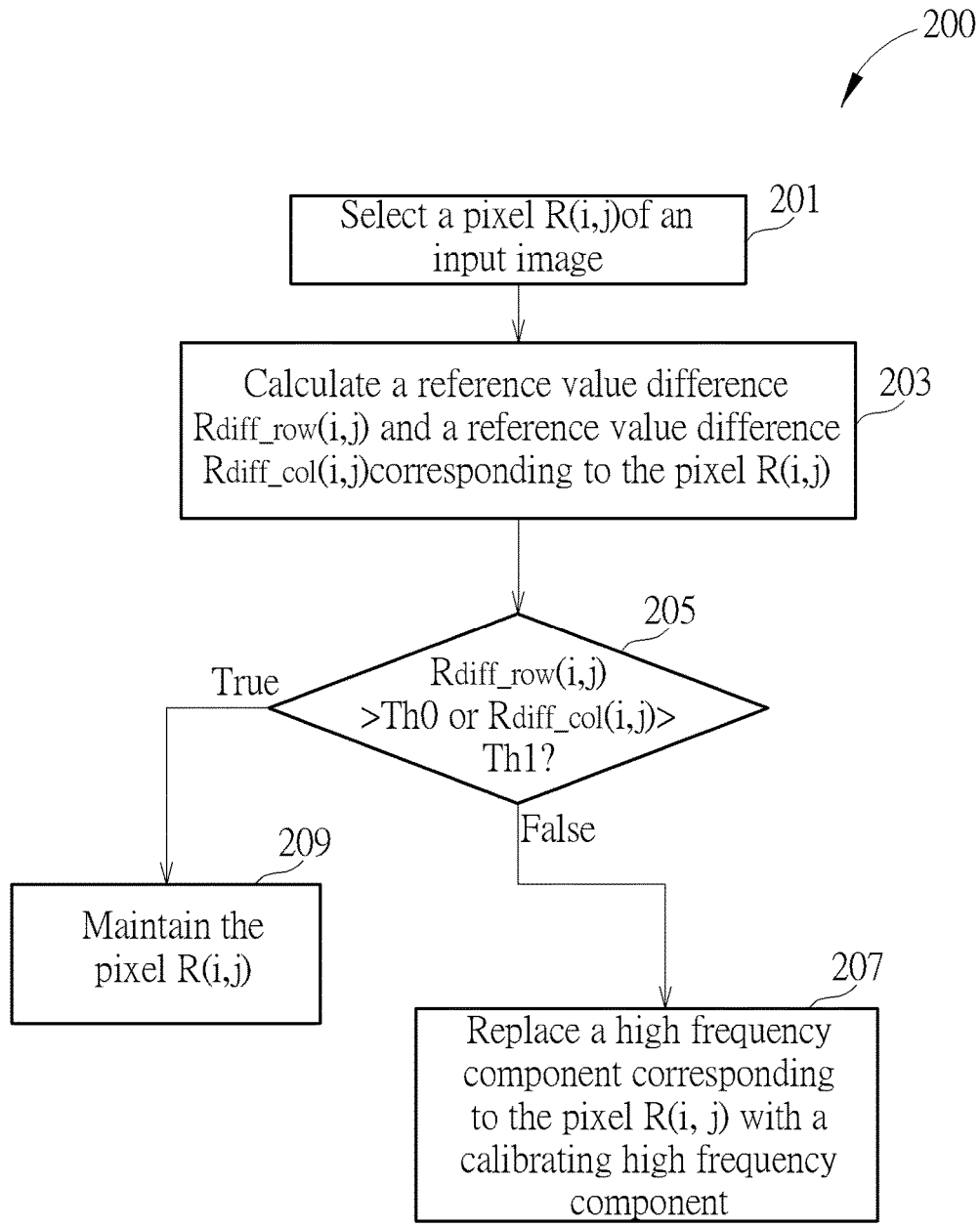
FIGS. 2-4 are flow charts illustrating image noise suppressing methods according to different embodiments of the present disclosure.
Figure 3:
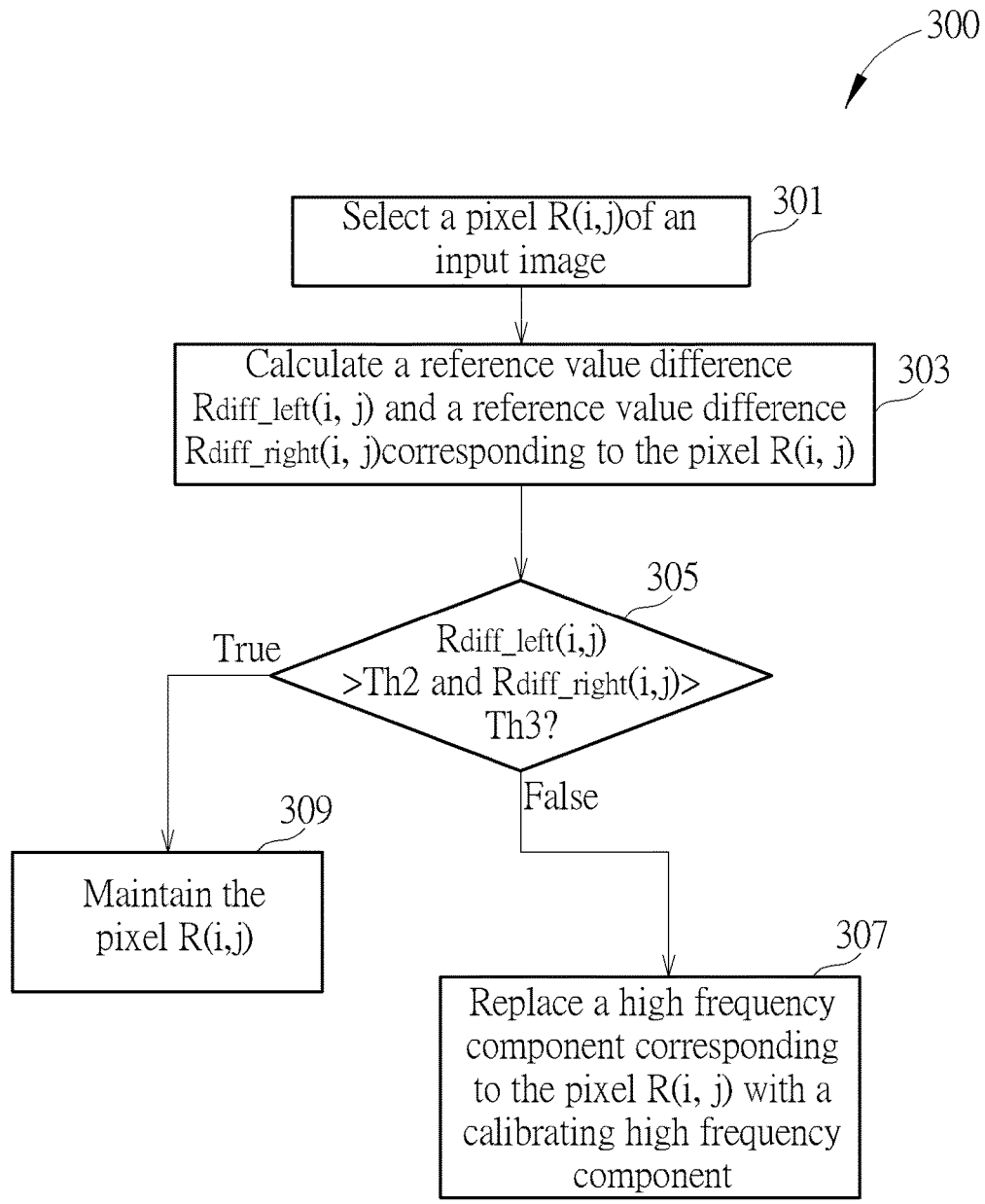
Figure 4:
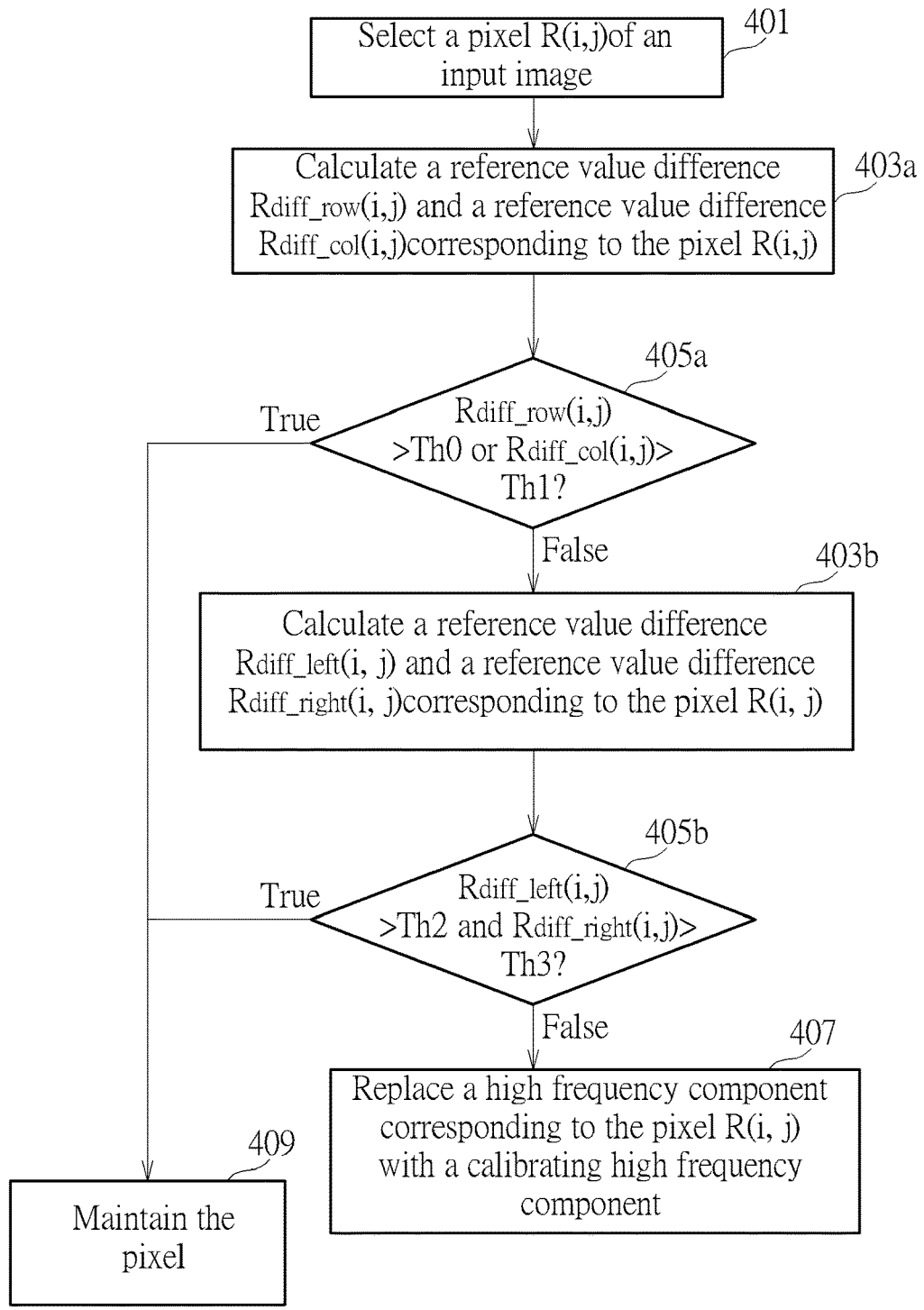

Reference is made to FIGS. 1-4. FIG. 1 is a schematic diagram illustrating image pixels according to one embodiment of the present disclosure, and FIGS. 2-4 are flow charts illustrating image noise suppressing methods according to different embodiments of the present disclosure. In FIGS. 1-4, pixels in an R channel are taken as examples for explanation. However, pixels in other channels can be employed as well, such as pixels in G, B channels, or pixels in Y, U, V channels. In the embodiments illustrated in FIG. 2 and FIG. 3, the image noise suppressing methods can be employed to determine different types of edges.

Reference is now made to FIG. 1 and FIG. 2. The image noise suppressing method 200 illustrated in FIG. 2 comprises the following steps 201-209.

Step 201

Select a pixel R(i,j) of an input image. The pixel R(i,j) corresponds to a pixel P(i,j) and indicates a pixel in the R channel located at the $i^{th}$ row and $j^{th}$ column in the input image. Following the same rule, the pixel R(i−1,j) indicates a pixel in the R channel located at the $(i-1)^{th}$ row and $j^{th}$ column in the input image.

Step 203

Calculate a reference value difference $R_{diff\_row}(i,j)$ and a reference value difference $R_{diff\_col}(i,j)$ corresponding to the pixel $R(i,j)$. The reference value difference $R_{diff\_row}(i,j)$ is employed to determine if any horizontal edge exists, and the $R_{diff\_col}(i,j)$ is employed to determine if any vertical (up and down) edge exists. In following description, Equations 1-3 and Equations 4-6 are employed to explain how to calculate reference value differences $R_{diff\_row}(i,j)$ and $R_{diff\_col}(i,j)$ respectively. It should be noted that, in the present disclosure, the symbol for labeling one pixel also represents the pixel value of the corresponding pixel.

$$R_{avg\_row\_cur}(i,j)=(R(i,j-2)+R(i,j-1)+4*R(i,j)+R(i,j+1)+R(i,j+2))/8 \quad \text{Equation 1}$$

$$R_{avg\_row\_pre}(i,j)=(R(i-1,j-2)+R(i-1,j-1)+4*R(i-1,j)+R(i-1,j+1)+R(i-1,j+2))/8 \quad \text{Equation 2}$$

$$R_{diff\_row}(i,j)=|R_{avg\_row\_cur}(i,j)-R_{avg\_row\_pre}(i,j)| \quad \text{Equation 3}$$

Equation 1 is employed to calculate a reference value $R_{avg\_row\_cur}(i,j)$, which indicates a weighted average pixel value corresponding to the pixel $R(i,j)$ in a horizontal direction. Equation 2 is employed to calculate a reference value $R_{avg\_row\_pre}(i,j)$, which indicates a weighted average pixel value corresponding to a previous row of the $R(i,j)$ in a horizontal direction. Equation 3 is employed to calculate a reference value difference $R_{diff\_row}(i,j)$, which is an absolute value of a difference between the reference values $R_{avg\_row\_cur}(i,j)$ and $R_{avg\_row\_pre}(i,j)$, to determine if any horizontal edge exists. In Equation 1, the weighted average, for example, is calculated based on the pixel $R(i,j)$, two pixels at the right side and two pixels at the left side of pixel $R(i,j)$. In another embodiment, the weighted average in Equation 1 can be calculated based on the pixel $R(i,j)$, n pixels at the right side and n pixels at the left side of the pixel $R(i,j)$, in which n is a positive integer. Correspondingly, in Equation 2, the weighted average is calculated based on the pixel $R(i-1,j)$, n pixels at the right side and n pixels at the left side of pixel $R(i-1,j)$. In other embodiments, the weighted average calculation can be replaced with other average calculation such as the normal average calculation or the exponential average calculation.

$$R_{avg\_col\_left}(i,j)=(R(i,j-2)+R(i,j-1)+R(i-1,j-1)+R(i-1,j-2))/4 \quad \text{Equation 4}$$

$$R_{avg\_col\_right}(i,j)=(R(i,j+1)+R(i,j+2)+R(i-1,j+1)+R(i-1,j+2))/4 \quad \text{Equation 5}$$

$$R_{diff\_col}(i,j)=|R_{avg\_col\_left}(i,j)-R_{avg\_col\_right}(i,j)| \quad \text{Equation 6}$$

Equation 4 is employed to calculate a reference value $R_{avg\_col\_left}(i,j)$, which indicates an average pixel value corresponding to pixels at the left side of the $R(i,j)$. Also, the Equation 5 is employed to calculate a reference value $R_{avg\_col\_right}(i,j)$, which indicates an average pixel value corresponding to pixels at the right side of the $R(i,j)$. Equation 6 is employed to calculate a reference value difference $R_{diff\_col}(i,j)$, which is an absolute value of a difference between the reference values $R_{avg\_col\_left}(i,j)$ and $R_{avg\_col\_right}(i,j)$, to determine if any vertical edge exists. In Equation 4, the normal average of two pixels at the left side of the pixel $R(i,j)$ and two pixels at the left side of the pixel $R(i-1,j)$ is calculated. In another embodiment, the normal average of k pixels in different rows at the left side of the pixel $R(i,j)$ is calculated, in which k is a positive integer. Correspondingly, in Equation 5, the normal average of k pixels in different rows at the right side of the pixel $R(i,j)$ can be calculated. In other embodiments, the normal average calculation can be replaced with other types of average calculation such as the weighted average calculation or the exponential average calculation.

Step 205

Determine if the $R_{diff\_row}(i,j)$ is larger than the threshold value Th0, and determine if the $R_{diff\_col}(i,j)$ is larger than the threshold value Th1. If any of the above determination result is true, it means that the input image has an image edge and the method 200 goes to step 209. If none of the above determination result is true, it means that the image edge does not exist, and the method 200 goes to step 207.

Step 207

Replace a high frequency component corresponding to the pixel $R(i,j)$ with a calibrating high frequency component, to generate a calibrated pixel $R_p(i,j)$ in a calibrated image. Details of the high frequency component and the calibrating high frequency component are described in detail in the following paragraphs.

Step 209

Maintain the pixel $R(i,j)$.

In some embodiments, since the vertical edge is not limited to one type, if the difference between pixels at the right side of the pixel $R(i,j)$ and pixels at the left side of the pixel $R(i,j)$ is small, but differences between the pixel $R(i,j)$ and pixels at the right side of the pixel $R(i,j)$ (i,j and between the pixel $R(i,j)$ and pixels at the left side of pixel are large, (i,j (i,j the pixel $R(i,j)$ is still an image edge. The image noise suppressing method 300 in FIG. 3 can determine if the noise suppressing should be performed or not based on the existence of such image edge.

As illustrated in FIG. 3, the image noise suppressing method 300 comprises steps 301-309, in which the steps 301, 307, 309 of the image noise suppressing method 300 are similar to the steps 201, 207, 209 of the image noise suppressing method 200, and, thus, descriptions thereof are omitted for brevity here.

Step 303:

Calculate a reference value difference $R_{diff\_left}(i,j)$ and a reference value difference $R_{diff\_right}(i,j)$ corresponding to the pixel $R(i,j)$. The reference value difference $R_{diff\_left}(i,j)$ and the reference value difference $R_{diff\_right}(i,j)$ can be employed to determine if any vertical edge exists. Equations 4, 5 and Equations 7, 8 describe how to calculate reference value differences.

$$R_{diff\_left}(i,j)=|R(i,j)-R_{avg\_col\_left}(i,j)| \quad \text{Equation 7}$$

$$R_{diff\_right}(i,j)=|R(i,j)-R_{avg\_col\_right}(i,j)| \quad \text{Equation 8}$$

Equation 7 is employed to calculate a reference value difference $R_{diff\_left}(i,j)$ which indicates an absolute value of a difference between the pixel value of the pixel $R(i,j)$ and the reference value $R_{avg\_col\_left}(i,j)$. Equation 8 is employed to calculate a reference value difference $R_{diff\_right}(i,j)$ which indicates an absolute value of a difference between the pixel value of the pixel $R(i,j)$ and the reference value $R_{avg\_col\_right}(i,j)$ Step 305

Determine if the $R_{diff\_left}(i,j)$ is larger than a threshold value Th2, and determine if the $R_{diff\_right}(i,j)$ is larger than the threshold value Th3. If any of the above determination result is true, it means that the input image has an image edge, and the method 300 goes to step 309. If none of the above determination result is true, it means that the image edge does not exist, and the method 300 goes to step 307.

It should be noted that the embodiments in FIG. 2 and FIG. 3 can be combined. Reference is made to FIG. 4 which illustrates a flow chart combining the noise suppressing method 200 and the noise suppressing method 300. Step 401 corresponds to steps 201, 301, step 403a corresponds to step 203, step 405a corresponds to step 205, step 403b corresponds to step 303, step 405b corresponds to step 305, step 407 corresponds to step 207 or step 307, and step 409 corresponds to step 209 or step 309. Details of each step in FIG. 4 are already illustrated in above-mentioned embodiments, and thus are omitted for brevity here.

In some embodiments, steps 403a and 403b can be simultaneously performed, and steps 405a and 405b can be simultaneously performed. If the conditions stated in steps 405a and 405b are not met, the method goes to step 407. Oppositely, the method goes to step 409.

In some embodiments, if an pixel above the pixel R(i,j) and an pixel below the pixel R(i,j) have larger differences from the pixel R(i,j) respectively, the pixel R(i,j) is also an image edge. In such case, the noise suppressing method 300 in FIG. 3 can also be employed to suppress noise of the pixel R(i,j). In addition, if indices for rows and columns are exchanged in the noise suppressing method 300, the horizontal edge can be determined.

In above-mentioned embodiments, pixels that are not processed by an image noise suppressing method are taken as an example for explanation. However, if the input image is processed by the image noise suppressing method, the pixels can be processed each by each in the row order or the column order. Therefore, in one embodiment of present disclosure, pixel values of calibrated pixels which have been processed by an image noise suppressing method are employed to perform the image noise suppressing method. Take FIG. 5 for example, pixels of the $(i-1)^{th}$ row have been processed by the above-mentioned image noise suppressing method, and pixel values thereof are pixel values of calibrated pixels which have been processed by the image noise suppressing method. Such kind of pixel is labeled as $R_p$. Accordingly, Equations 2, 4 and 5 can be amended to the following Equations 2-1, 4-1 and 5-1 to perform the image noise suppressing method illustrated in FIGS. 2-4.

$$R_{avg\_row\_pre}(i,j)=(R_p(i-1,j-2)+R_p(i-1,j-1)+4*R_p(i-1,j)+R_p(i-1,j+1)+R_p(i-1,j+2))/8 \quad \text{Equation 2-1}$$

$$R_{avg\_col\_left}(i,j)=(R(i,j-2)+R(i,j-1)+R_p(i-1,j-1)+R_p(i-1,j-2))/4 \quad \text{Equation 4-1}$$

$$R_{avg\_col\_right}(i,j)=(R(i,j+1)+R(i,j+2)+R_p(i-1,j+1)+R_p(i-1,j+2))/4 \quad \text{Equation 5-1}$$

In view of above-mentioned description, the image noise suppressing methods are not performed to an image edge. Accordingly, the conventional image dragging issue can be avoided.

In the above-mentioned embodiments, if the image edge does not exist, the high frequency component of the selected pixel is replaced by a calibrating high frequency component. Details of generating the calibrating high frequency component are illustrated in the following description. It should be noted that, in the following description, the high frequency component means a portion of a pixel corresponding to larger variation in an image. On the other hand, the low frequency component means a portion of a pixel corresponding to less variation in an image.

Figure 6:
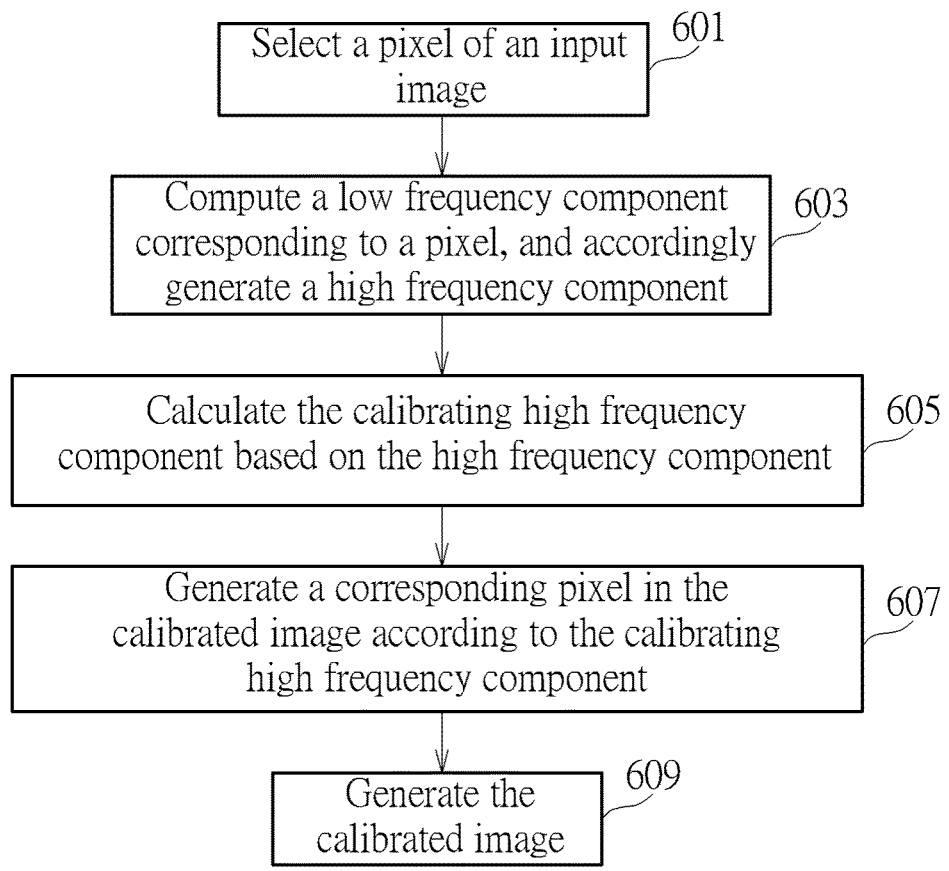
FIG. 6 is a flow chart illustrating the steps for calculating a high frequency component and generating a calibrated image according to one embodiment of the present disclosure.

Reference is made to FIG. 1 and FIG. 6 to explain a method of generating the calibrating high frequency component. FIG. 6 is a flow chart illustrating the steps for calculating the high frequency component and generating a calibrated image according to one embodiment of the present disclosure. FIG. 6 comprises steps 601-609.

Step 601
Select a pixel of an input image.

Step 603
Compute a low frequency component corresponding to a pixel, and accordingly generate a high frequency component. In one embodiment, Equations 9 and 10 are employed to compute the low frequency component and the high frequency component. It should be noted that R(i,j) is employed for explanation in Equations 9 and 10. However, pixels in G and B channels can also be employed in Equations 9 and 10.

$$R\_LP(i,j)=(3*R(i,j)+R(i-1,j-2)+R(i-1,j-1)+R(i-1,j)+R(i-1,j+1)+R(i-1,j+2))/8 \quad \text{Equation 9}$$

$$R\_HP(i,j)=R(i,j)-R\_LP(i,j) \quad \text{Equation 10}$$

R_LP(i,j) and R_HP(i,j) indicate the low frequency component and the high frequency component of the pixel R(i,j) respectively. Equation 9 computes a weighted average of pixel values of the pixel R(i,j) and five pixels in a previous row (i.e., $(i-1)^{th}$ row), to acquire the low frequency component R_LP(i,j) of the pixel R(i,j). Also, the Equation 10 subtracts R_LP(i,j) from a pixel value of the pixel R(i,j), to acquire the high frequency component R_HP(i,j) of the pixel R(i,j) It should be noted that the way of calculating the low frequency component is not limited to Equation 9, and is not limited to considering only 6 pixels. Correspondingly, the way of calculating the high frequency component is not limited to Equation 10.

Step 605
Calculate the calibrating high frequency component Y_HP(i,j) based on the high frequency component. In one embodiment, the high frequency component Y_HP(i,j) is acquired by the following Equation 11.

$$Y\_HP(i,j)=(R\_HP(i,j)+2-G\_HP(i,j)+B\_HP(i,j))/4 \quad \text{Equation 11}$$

High frequency components R_HP(i,j), G_HP(i,j), B_HP(i,j) respectively correspond to R, G, B channels. Equation 11 calculates the weighted average of the high frequency components R_HP(i,j), G_HP(i,j), B_HP(i,j), to acquire the calibrating high frequency component Y_HP(i,j). In some embodiments, the weighted coefficient is not limited to the coefficients illustrated in Equation 11. Additionally, in another embodiment, the calibrating high frequency component Y_HP(i,j) may be the high frequency component R_HP(i,j) corresponding to the R channel, the high frequency component G_HP(i,j) corresponding to the G channel, or the high frequency component B_HP(i,j) corresponding to the B channel. Therefore, the calibrating high frequency component Y_HP(i,j) can be determined based on high frequency component(s) of at least one color channel in the input image.

Step 607
Generate a corresponding pixel in the calibrated image according to the calibrating high frequency component Y_HP(i,j).

$$R_p(i,j)=R\_LP(i,j)+Y\_HP(i,j) \quad \text{Equation 12}$$

A pixel value of the corresponding pixel $R_p(i,j)$ in the R channel of the calibrated image equals to the original low frequency component R_LP(i,j) plus the calibrating high frequency component Y_HP(i,j).

Similarly, the above-mentioned Equations 9-12 are not limited to be employed to pixels that are not processed by the image noise suppressing method, and can be employed to pixels that have been processed by the image noise suppressing method as well. Take FIG. 5 for example, if pixels in the $(i-1)^{th}$ row have been processed by the above-mentioned image noise suppressing method, pixel values thereof are pixel values of calibrated pixel which have been processed by the image noise suppressing method. Such kind of pixel is labeled as $R_p$. Therefore, the above-mentioned Equation 9 can be amended to the following Equation 9-1.

$$R\_LP(i,j)=(3*R(i,j)+R_p(i-1,j-2)+R_p(i-1,j-1)+R_p(i-1,j)+R(i-1,j+)+R_p(i-1,j+2))/8 \quad \text{Equation 9-1}$$

The details of combing Equations 9-1, 10-12 and details of combing Equations 9, 10-12 are similar, and description thereof is omitted for brevity here.

Figure 7:
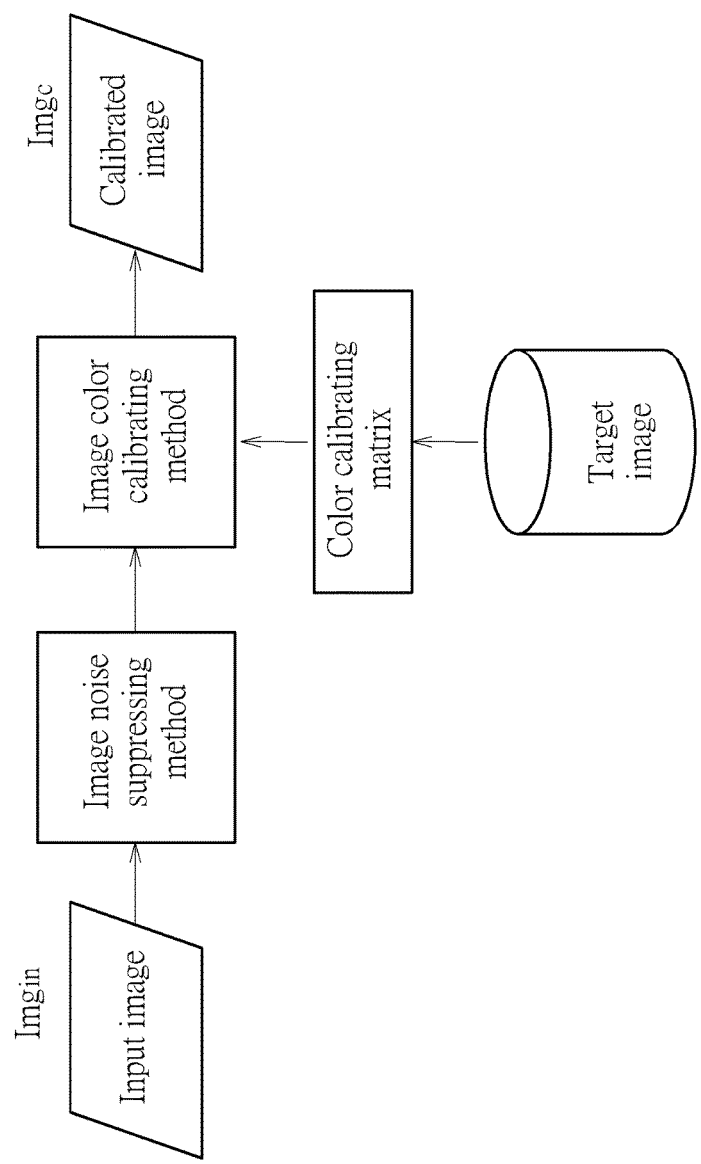
FIG. 7 is a schematic diagram illustrating an image processing method according to one embodiment of the present disclosure.

In one embodiment, the present disclosure further provides an image processing method, which further comprises an image color calibrating method besides the above-mentioned image suppressing method for suppressing the noise, to make the image color more ideal. As illustrated in FIG. 7, the input image $\text{Img}_{in}$ is further processed by the image color calibrating method to generate the calibrated image $\text{Img}_c$ after processed by the above-mentioned image noise suppressing method. The image color calibrating method is employed to process an image processed by the noise suppressing method according to a color calibrating matrix. Details of a method for generating the color calibrating matrix is described in the following description.

The method for generating the color matrix comprises the following steps: input a comparing image comprising a plurality of image blocks, in which the comparing image corresponds to the input image; computing a pixel statistic value of each color channel in all image blocks; and calculating a color calibrating matrix according to the pixel statistic value and a target statistic value.

Figure 8:
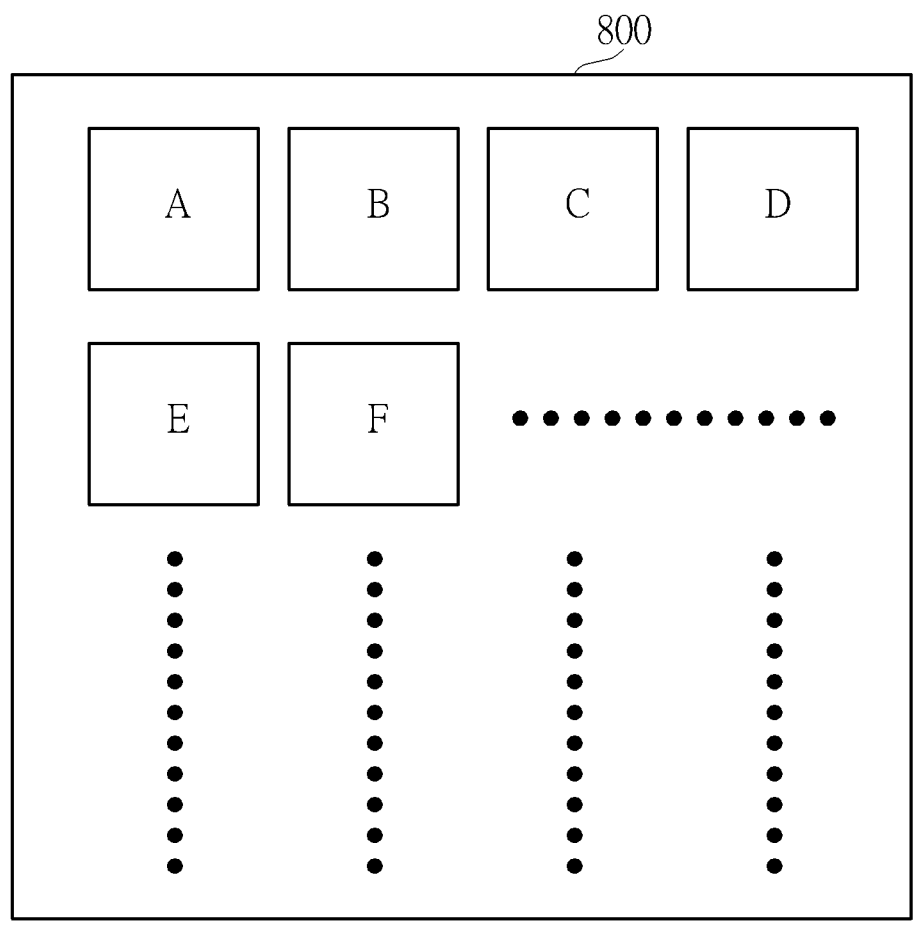
FIG. 8 is a schematic diagram illustrating a color card according to one embodiment of the present disclosure.

For more details, in some embodiments, the comparing image can be acquired via capturing an image of a color card, which can be a color checker for color calibration, such as GretagMacbeth ColorChecker. It should be noted that, the comparing image can correspond to the input image. For example, the comparing image has a photograph environment similar to the one of the input image, such as the light source. FIG. 8 is a schematic diagram illustrating a color card according to one embodiment of the present disclosure. The color card 800 comprises a plurality of color blocks, i.e., the above-mentioned image blocks. It should be noted that only part of the color blocks are symbolized, such as color blocks A-F. Also, different color blocks have different colors. After the comparing image is inputted, the pixel statistic value of each channel in the comparing image is calculated. For example, a plurality of pixels are selected in each of the image blocks, and an average value of each image block is calculated to acquire a corresponding average pixel. Then, the average pixels of all image blocks are summed and divided by the number of the image blocks, to calculate the pixel statistic value, such as the input image vectors $[R_{input} \ G_{input} \ B_{input}]^T$ shown in the following Equation 13. $^T$ indicates a transpose operator. The target statistic value is also generated according to this color card image, but the target statistic value may correspond to parameters, e.g., brightness or color temperature, different from parameters to which the comparing image corresponds. The target statistic value for each channel may be the target image vectors $[R_{target} \ G_{target} \ B_{target}]^T$ in Equation 13. Based on the input image vectors $[R_{input} \ G_{input} \ B_{input}]^T$, the target image vectors $[R_{target} \ G_{target} \ B_{target}]^T$, and a least square method, the color calibrating matrix can be acquired $$\left(\text{e.g.,}\begin{bmatrix} C_{11} & C_{12} & C_{13} \\ C_{21} & C_{22} & C_{23} \\ C_{31} & C_{32} & C_{33} \end{bmatrix}\right).$$

That is, the input image vectors can be changed to target image vectors by the color calibrating matrix.

$$\begin{bmatrix} R_{target} \\ G_{target} \\ B_{target} \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} R_{input} \\ G_{input} \\ B_{input} \end{bmatrix} \quad \text{Equation 13}$$

Figure 9:
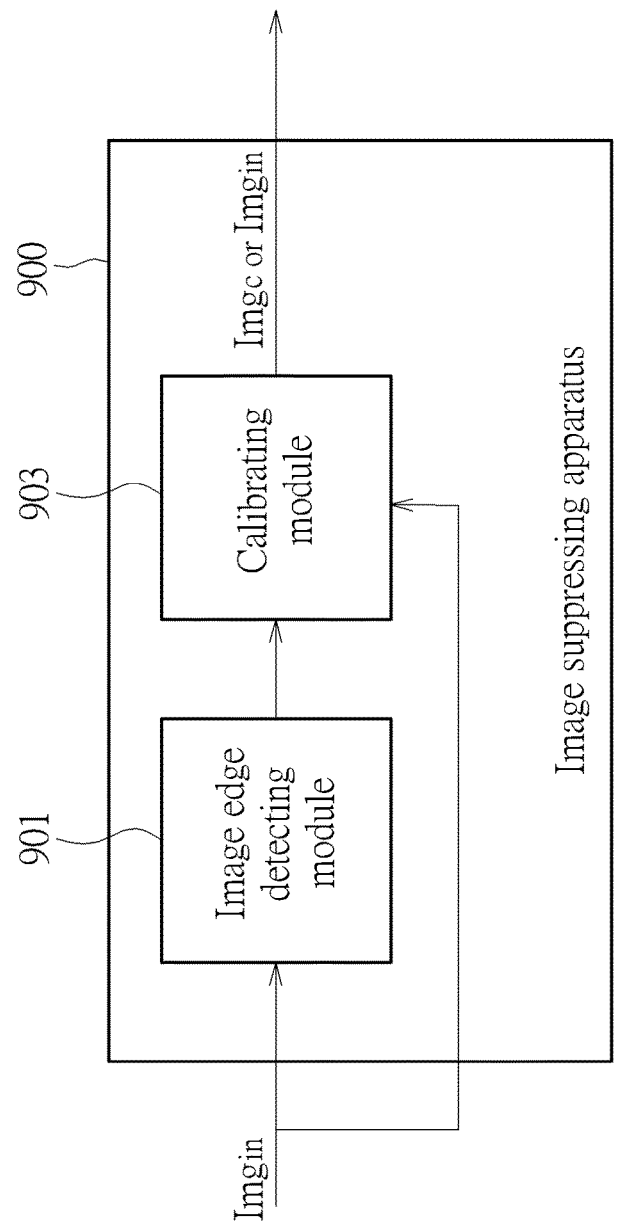
FIG. 9 is a block diagram illustrating an image suppressing apparatus according to one embodiment of the present disclosure.

FIG. 9 is a block diagram illustrating an image suppressing apparatus according to one embodiment of the present disclosure. As illustrated in FIG. 9, the image noise suppressing apparatus 900 comprises an image edge detecting module 901 and a calibrating module 903. The image edge detecting module 901 is employed to determine if the input image $\text{Img}_{in}$ has any image edge. If the image edge does not exist, the calibrating module 903 replaces the high frequency component in at least one channel of the input image $\text{Img}_{in}$ with calibrating high frequency component, to generate the calibrated image $\text{Img}_c$. If the image edge exists the calibrating module 903 does not calibrate the input image $\text{Img}_{in}$ and directly outputs the input image $\text{Img}_{in}$.

In view of above-mentioned embodiments, the conventional dragging issue can be avoided since the noise suppressing is not performed on image edges. In addition, the image can have expected color and a better image quality by process of the above-mentioned color calibrating matrix.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An image processing method for processing an input image, comprising following steps:
    selecting a pixel of the input image;
    determining if the pixel is a first image edge according to at least one first calibrated pixel and at least one second pixel in the input image, wherein the first calibrated pixel corresponds to at least one first pixel in the input image; and
    replacing a high frequency component of at least one channel of the pixel with a first calibrating high frequency component if the pixel is not the first image edge, to generate a calibrated pixel, and maintaining the pixel as the calibrated pixel if the pixel is the first image edge.

2. The image processing method of claim 1, wherein the at least one first calibrated pixel is generated according to the at least one first pixel via following first steps:
    (i) determining if the first pixel is a second image edge; and
    (ii) replacing the high frequency component of at least one channel of the first pixel with a second calibrating high frequency component if the pixel is not the second image edge, to generate the corresponding first calibrated pixel, and maintaining the first pixel as the first calibrated pixel if the pixel is the second image edge.

3. The image processing method of claim 1, wherein the step of determining if the pixel is the first image edge comprises:
    generating a first reference value according to a pixel value of a first channel of the pixel, and at least one pixel value of the first channel of the at least one second pixel;

generating a second reference value according to at least one pixel value of the first channel of the at least one first calibrated pixel;

calculating a difference between the first reference value and the second reference value to generate a reference value difference; and determining if the pixel is the first image edge according to the reference value difference.

4. The image processing method of claim 3, wherein the pixel is P(i,j) and the calibrated pixel is $P_p(i,j)$, wherein the P(i,j) indicates a pixel at a $i^{th}$ row and a $j^{th}$ column in the input image, wherein the at least one first pixel indicates pixel P(i−1, j−n) to pixel P(i−1, j+n) in the input image, wherein the at least one second pixel indicates pixel P(i,j−n) to pixel P(i,j−1) and pixel P(i,j+1) to pixel P(i,j+n) in the input image, in which the n is a positive integer.

5. The image processing method of claim 1, wherein the step of determining if the pixel is the first image edge comprises:

generating a first reference value according to pixel values of a first channel of m third pixels, wherein the m third pixels are at one side of the pixel;

generating a second reference value according to pixel values of the first channel of m fourth pixels, wherein the m fourth pixels are at another side of the pixel, wherein if any one of the m third pixels or any one of the m fourth pixels is the first pixel, replacing a pixel value of the first pixel with a pixel value of the corresponding first calibrated pixel;

calculating a difference between the first reference value and the second reference value to generate a reference value difference; and determining if the pixel is the first image edge according to the reference value difference.

6. The image processing method of claim 1, wherein the step of determining if the pixel is the first image edge comprises:

generating a first reference value according to pixel values of a first channel of m third pixels, wherein the m third pixels are at one side of the pixel;

generating a second reference value according to pixel values of the first channel of m fourth pixels, wherein the m fourth pixels are at another side the pixel, wherein if any one of the m third pixels or any one of the m fourth pixels is the first pixel, replacing a pixel value of the first pixel with a pixel value of the corresponding first calibrated pixel;

calculating a first reference value difference according to the first reference value and a pixel value of the first channel of the pixel, and calculating a second reference value difference according to the second reference value and a pixel value of the first channel of the pixel; and determining if the pixel is the first image edge according to the first reference value difference and the second reference value difference.

7. The image processing method of claim 1, wherein the first calibrating high frequency component is determined according to the high frequency component of the at least one channel of the pixel.

8. The image processing method of claim 7, wherein the high frequency component can be generated by followings steps:

generating a low frequency component of the channel of the pixel according to a pixel value of the cannel of the pixel and at least one pixel value of the channel of the at least one first calibrated pixel; and acquiring the high frequency component of the channel of the pixel by subtracting the low frequency component from the pixel value of the channel of the pixel.

9. The image processing method of claim 1, further comprising:

calibrating the calibrated pixel by a color calibrating matrix, wherein the color calibrating matrix may be generated by following steps:

defining a comparing image as a plurality of image blocks, wherein the comparing image corresponds to the input image;

calculating pixel statistic values in the image blocks; and calculating the color calibrating matrix according the pixel statistic values and a plurality of target statistic values.

10. An image processing apparatus, comprising:

an image edge detecting module, configured to determine if a pixel in the input image is a first image edge according to at least one first calibrated pixel and at least one second pixel of the input image, wherein the at least one first calibrated pixel corresponds to at least one first pixel in the input image; and a calibrating module, configured to replace a high frequency component of at least one channel of the pixel with a first calibrating high frequency component if the pixel is not the first image edge, to generate a calibrated pixel, and configured to maintain the pixel as the calibrated pixel if the pixel is the first image edge.

11. The image processing apparatus of claim 10, wherein the at least one first calibrated pixel is generated according to the at least one first pixel by following steps:

(i) determining if the first pixel is a second image edge by the image edge detecting module; and (ii) replacing the high frequency component of at least one channel of the first pixel with a second calibrating high frequency component by the calibrating module if the pixel is not the second image edge, to generate the corresponding first calibrated pixel, and maintaining the first pixel as the first calibrated pixel by the calibrating module if the pixel is the second image edge.

12. The image processing apparatus of claim 10, wherein the image edge detecting module determines if the pixel is the first image edge by following steps:

generating a first reference value according to a pixel value of a first channel of the pixel, and at least one pixel value of the first channel of the at least one second pixel;

generating a second reference value according to at least one pixel value of the first channel of the at least one first calibrated pixel;

calculating a difference between the first reference value and the second reference value to generate a reference value difference; and determining if the pixel is the first image edge according to the reference value difference.

13. The image processing apparatus of claim 12, wherein the pixel is P(i,j) and the calibrated pixel is $P_p(i,j)$, wherein the P(i,j) indicates a pixel at a $i^{th}$ row and a $j^{th}$ column in the input image, wherein the at least one first pixel indicates pixel P(i−1, j−n) to pixel P(i−1, j+n) in the input image, wherein the at least one second pixel indicates pixel P(i,j−n) to pixel P(i,j−1) and pixel P(i,j+1) to pixel P(i,j+n) in the input image, in which the n is a positive integer.

14. The image processing apparatus of claim 10, wherein the image edge detecting module determines if the pixel is the first image edge by following steps:

generating a first reference value according to pixel values of a first channel of m third pixels, wherein the m third pixels are at one side of the pixel;

generating a second reference value according to pixel values of the first channel of m fourth pixels, wherein the m fourth pixels are at another side of the pixel, wherein if any one of the m third pixels or any one of the m fourth pixels is the first pixel, replacing a pixel value of the first pixel with a pixel value of the corresponding first calibrated pixel;

calculating a difference between the first reference value and the second reference value to generate a reference value difference and;

determining if the pixel is the first image edge according to the reference value difference.

15. The image processing apparatus of claim 10, wherein the image edge detecting module determines if the pixel is the first image edge by following steps:

generating a first reference value according to pixel values of a first channel of m third pixels, wherein the m third pixels are at one side of the pixel;

generating a second reference value according to pixel values of the first channel of m fourth pixels, wherein the m fourth pixels are at another side the pixel, wherein if any one of the m third pixels or any one of the m fourth pixels is the first pixel, replacing a pixel value of the first pixel with a pixel value of the corresponding first calibrated pixel;

calculating a first reference value difference according to the first reference value and a pixel value of the first channel of the pixel, and calculating a second reference value difference according to the second reference value and a pixel value of the first channel of the pixel; and determining if the pixel is the first image edge according to the first reference value difference and the second reference value difference.

16. The image processing apparatus of claim 10, wherein the first calibrating high frequency component is determined according to the high frequency component of the at least one channel of the pixel.

17. The image processing apparatus of claim 16, wherein the high frequency component can be generated by followings steps:

generating a low frequency component of the channel of the pixel according to a pixel value of the cannel of the pixel and at least one pixel value of the channel of the at least one first calibrated pixel; and acquiring the high frequency component of the channel of the pixel by subtracting the low frequency component from the pixel value of the channel of the pixel.

18. The image processing apparatus of claim 10, wherein the calibrating module further calibrates the calibrated pixel by a color calibrating matrix, wherein the color calibrating matrix may be generated by following steps:

defining a comparing image to a plurality of image blocks, wherein the comparing image corresponds to the input image;

calculating pixel statistic values in the image blocks; and calculating the color calibrating matrix according the pixel statistic values and a plurality of target statistic values.

* * * * *